US011172003B1

(12) United States Patent
Maloney et al.

(10) Patent No.: US 11,172,003 B1
(45) Date of Patent: Nov. 9, 2021

(54) SYSTEM AND METHOD TO CONTROL A MEDIA CLIENT USING A MESSAGE SERVICE

(71) Applicant: Accenture Global Solutions Limited, Dublin (IE)

(72) Inventors: Chris Adam Maloney, Jamesburg, NJ (US); John Carl Anderson, Broadlands, VA (US); Connor Fox Bourke, Philadelphia, PA (US); Yu Chang Ou, King of Prussia, PA (US); Keerthi Samhita Vempatti Venkatanaga, King of Prussia, PA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/247,178

(22) Filed: Dec. 2, 2020

Related U.S. Application Data

(60) Provisional application No. 63/079,776, filed on Sep. 17, 2020.

(51) Int. Cl.
*H04L 29/06* (2006.01)

(52) U.S. Cl.
CPC .......... *H04L 65/1093* (2013.01); *H04L 63/08* (2013.01); *H04L 65/1073* (2013.01); *H04L 65/1076* (2013.01)

(58) Field of Classification Search
CPC . H04L 65/1093; H04L 63/08; H04L 65/1073; H04L 65/1076
See application file for complete search history.

(56) References Cited

U.S. PATENT DOCUMENTS

| 2008/0010673 | A1* | 1/2008 | Makino | G06F 21/31 726/6 |
| 2010/0077435 | A1* | 3/2010 | Kandekar | G11B 27/005 725/61 |
| 2013/0191903 | A1* | 7/2013 | Jaudon | H04L 63/08 726/7 |

(Continued)

OTHER PUBLICATIONS

Stone et al., "Consumer Insight: How to Use Data and Market Research to Get Closer to Your Customer," Market Research in Practice Series, 2004, pp. 81-82.

(Continued)

*Primary Examiner* — John A Follansbee
*Assistant Examiner* — Raqiul A Choudhury
(74) *Attorney, Agent, or Firm* — Harrity & Harrity, LLP

(57) ABSTRACT

A device may generate a registration mapping that associates a client identifier of a media client and a messaging identifier of a user device. The device may store the registration mapping in a registration data structure. The device may receive, via a messaging protocol, a message from the user device. The message may include the message identifier and an input for an application session of the media client. The device may determine, based on the registration data structure including the registration mapping and the message, that the user device is associated with the media client. The device may provide, via the messaging protocol, the message to the media client to permit the application session to operate according to the input.

20 Claims, 8 Drawing Sheets

(56) References Cited

U.S. PATENT DOCUMENTS

| | | | | |
|---|---|---|---|---|
| 2014/0122297 A1* | 5/2014 | Dunlap | .................. | H04W 4/14 |
| | | | | 705/26.61 |
| 2014/0214956 A1* | 7/2014 | Huo | ....................... | H04L 67/02 |
| | | | | 709/204 |
| 2014/0364056 A1* | 12/2014 | Belk | .................... | H04W 4/021 |
| | | | | 455/41.1 |
| 2015/0022619 A1* | 1/2015 | Aleixo Dinis Lopes | .................... | |
| | | | | H04N 21/6137 |
| | | | | 348/14.02 |
| 2015/0180822 A1* | 6/2015 | Mathias | ............. | H04L 65/1069 |
| | | | | 709/206 |
| 2016/0057179 A1* | 2/2016 | Volach | ............... | H04L 65/1093 |
| | | | | 370/261 |
| 2017/0192940 A1* | 7/2017 | Ghatage | ................. | G06F 16/93 |
| 2020/0220914 A1* | 7/2020 | Carrigan | ............ | H04L 65/4092 |

OTHER PUBLICATIONS

Jensen, "Interactive Television: New Genres, New Format, New Content," The Second Australasian Conference on Interactive Entertainment, University of Technology, Nov. 23-25, 2005, pp. 89-96.
Chauhan et al., "SMS Based Remote Control System," IJCSMS International Journal of Computer Science and Management Studies, vol. 11, Issue 2, Aug. 2011, pp. 19-24.

* cited by examiner

SYSTEM AND METHOD TO CONTROL A MEDIA CLIENT USING A MESSAGE SERVICE

CROSS-REFERENCE TO RELATED APPLICATION

This Patent Application claims priority to U.S. Provisional Patent Application No. 63/079,776, filed on Sep. 17, 2020, and entitled "SYSTEM AND METHOD TO CONTROL A MEDIA CLIENT USING A MESSAGE SERVICE." The disclosure of the prior Application is considered part of and is incorporated by reference into this Patent Application.

BACKGROUND

A media client (e.g., television set-top boxes, or the like) may receive both traditional television signals, via a dedicated connection, and Internet protocol (IP)-based data services, via an Internet connection. Video content may be delivered to the media client via the dedicated connection or via the Internet connection. The media client may be controlled using a remote control device via an infrared signal or other wireless access technologies such TCP/IP or Bluetooth.

SUMMARY

In some implementations, a method includes receiving a message from a user device, wherein the message includes an input for an application session running on a media client; determining that the user device is associated with the media client, based on a registration mapping and a messaging identifier associated with the message, wherein the messaging identifier is assigned to the user device according to a messaging protocol of the message; determining, from the message, input data associated with the input; providing the input data to the media client in association with an operation of the application session; receiving, from the media client, status data associated with the application session; determining, based on the registration mapping, that the status data is to be routed to the user device; and providing, via the messaging protocol, a status message associated with the status data to the user device.

In some implementations, a device includes one or more memories; and one or more processors, communicatively coupled to the one or more memories, configured to: receive a registration request associated with associating a media client with a user device; generate, based on the registration request, a registration mapping that maps a client identifier of the media client with a messaging identifier of the user device, wherein the messaging identifier is assigned to the user device according to a messaging protocol and the client identifier is assigned to the media client according to the messaging protocol; store the registration mapping in a registration data structure; receive, via the messaging protocol, a message from the user device, wherein the message includes an input for an application session running on the media client; determine that the message is associated with the user device based on the message including the messaging identifier; and route the message to the media client based on the message including the messaging identifier and the registration mapping.

In some implementations, a non-transitory computer-readable medium storing a set of instructions includes one or more instructions that, when executed by one or more processors of a device, cause the device to: generate a registration mapping that associates a client identifier of a media client and a messaging identifier of a user device; store the registration mapping in a registration data structure; receive, via a messaging protocol, a message from the user device, wherein the message includes the message identifier and an input for an application session of the media client; determine, based on the registration data structure including the registration mapping and the message, that the user device is associated with the media client; and provide, via the messaging protocol, the message to the media client to permit the application session to operate according to the input.

DETAILED DESCRIPTION

Figure 1A:
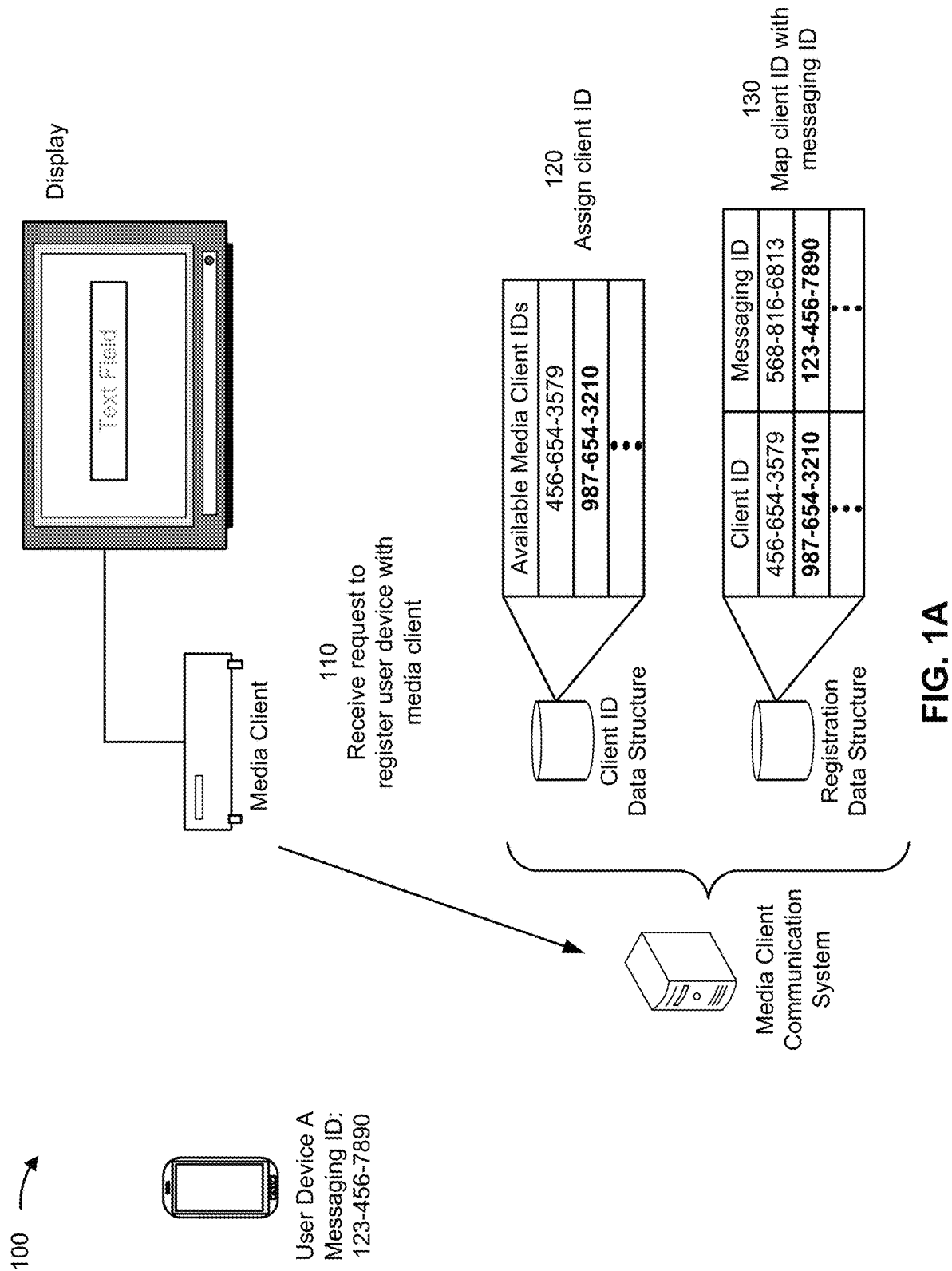
FIGS. 1A-1C are diagrams of an example implementation described herein.

The following detailed description of example implementations refers to the accompanying drawings. The same reference numbers in different drawings may identify the same or similar elements.

As media clients (e.g., set top boxes, over-the-top (OTT) streaming devices, smart televisions (TVs), and/or the like) have increased in functionality and capability, the need to enter text into applications, including the main "UI" application for the device, has increased. Examples of this include entering of user IDs/e-mail addresses and passwords into media applications (e.g., video streaming applications, audio streaming applications, etc.), entering queries to search for content via the media client and/or applications, and/or the like. Commonly, users may use remote control devices, stand-alone applications on a user device (e.g., a mobile phone, a tablet computer, and/or a similar device) tied to either the media client or a media service provider (or content provider), voice-based interfaces (e.g., of a remote control and/or the media client), and/or physical keyboards.

However, remote control devices can be error prone due to small form factors and/or limited quantities of input elements (e.g., buttons) that require use of a virtual keyboard on the media client, limited graphical user interface real estate that requires multiple virtual keyboards, and variation between virtual keyboards across applications on the media client. Further, using stand-alone applications associated with a media service provider on a user device requires downloading and/or installing to the user device by entering user credentials to access the stand-alone applications, thereby increasing complexity and consuming storage space of the user device. Voice-based interfaces can be inaccurate (e.g., especially due to noisy environments, certain accents, and/or certain speech impediments) and/or incapable of performing certain functions due to incompatibility with certain applications of the media clients. Physical keyboards (e.g., a full QWERTY keyboard, a number pad, and/or the like), while providing a larger form factor to allow for additional input elements, can be inconvenient to a user due to the size and/or require additional hardware and/or wireless connection capability to the media client.

Some implementations, described herein, provide a device that is configured to route messages (e.g., provided by a user device) to a media client (e.g., set top boxes, over-the-top (OTT) streaming devices, smart televisions (TVs), and/or the like) to cause the media client to perform a function. The device may receive a registration request associated with associating a media client with a user device. The device may generate, based on the registration request, a registration mapping that maps a client identifier of the media client with a messaging identifier of the user device. The messaging identifier may be assigned to the user device according to a messaging protocol and the client identifier is assigned to the media client according to the messaging protocol. The device may store the registration mapping in a registration data structure. The device may receive, via the messaging protocol, a message from the user device. The message may include an input for an application session running on the media client. The device may determine that the message is associated with the user device based on the message including the messaging identifier and may route the message to the media client based on the messaging identifier and the registration mapping.

The device, described herein, routes messages (e.g., using one or more types of messaging services) to a media client to cause the media client to perform a function. Accordingly, the device enables control of a media client, via a user device, without having to install, download, and/or log into one or more applications on the user device to configure the user device to control the media client, thereby conserving computing resources (e.g., processing resources, memory resources, and/or the like) otherwise consumed to store, maintain, or process application data of the one or more applications and/or communication resources (e.g., communication resources of the user device and/or a network) otherwise consumed by transmitting and/or receiving application data associated with the one or more applications.

Furthermore, some implementations may prevent the need for dedicated hardware (e.g., a remote control device and/or a keyboard) to control and/or provide commands to a media client by enabling use of a user device that is likely to be more readily available to a user (e.g., in the event that a remote control and/or keyboard device is lost and/or inconvenient for the user to use). Moreover, some examples may enhance a user experience with respect to interacting with a media client by enabling simplified and/or universal control of a media client using an existing and/or relatively simple messaging interface of a user device available to the user.

Figure 1B:
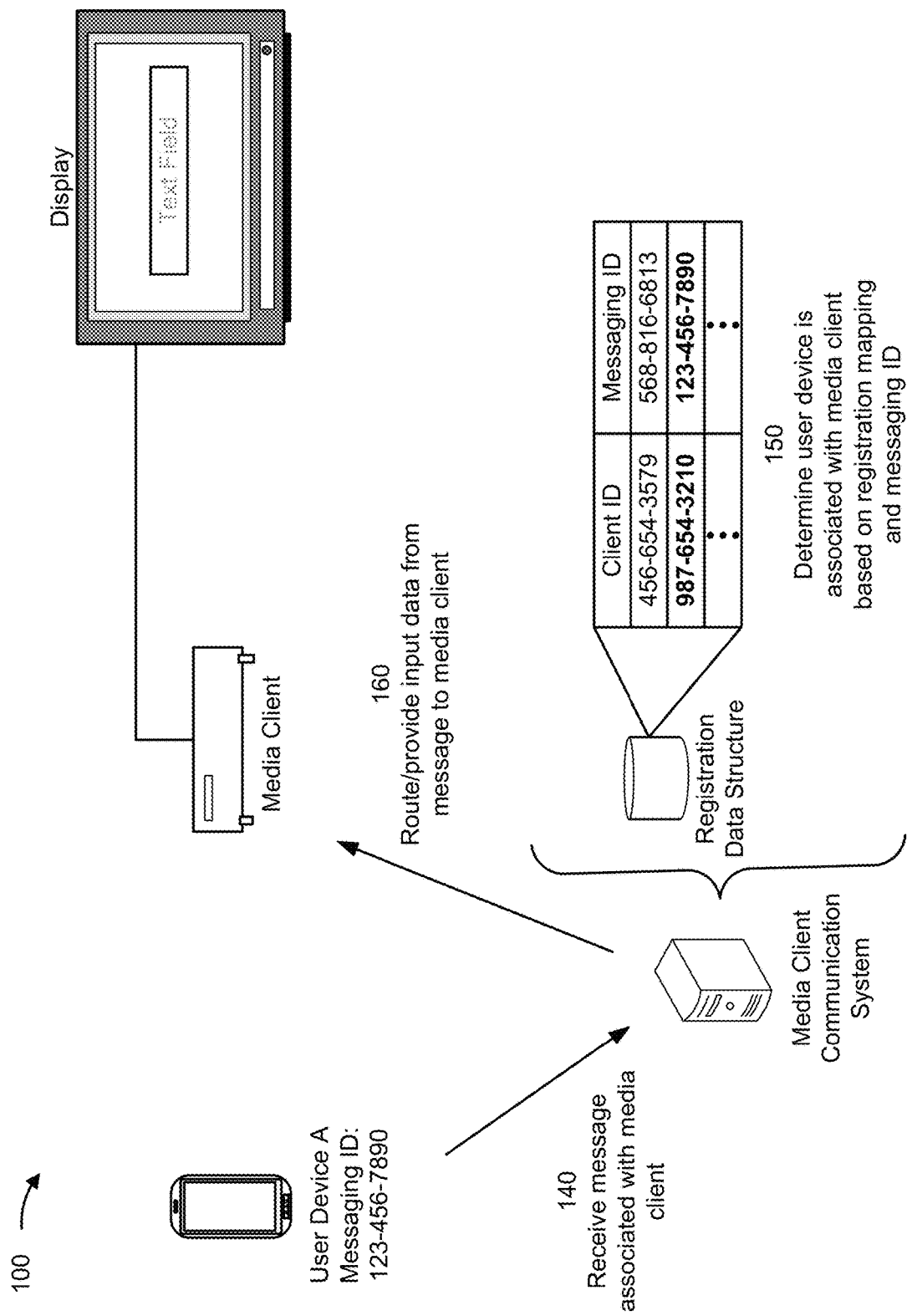
Figure 1C:
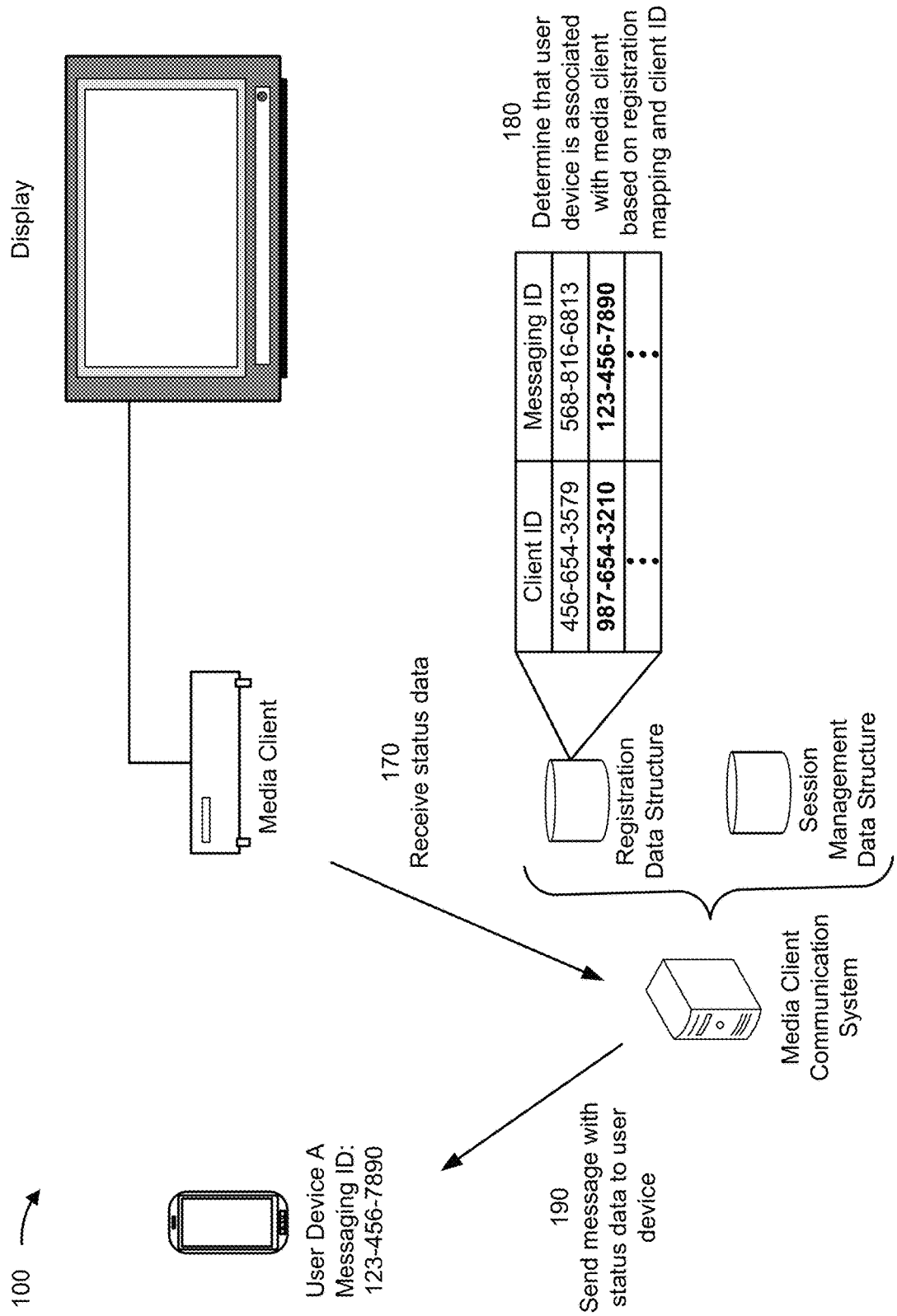

FIGS. 1A-1C are diagrams of an example implementation 100 described herein. Example implementation 100 may be associated with controlling and/or communicating with a media client using a message service. As shown in FIGS. 1A-1C, example implementation 100 includes a media client, a user device, and a media client communication system. The media client communication system may be associated with the media client and/or the user device. The media client and the user device may be associated with a same user (e.g., the media client may be owned or leased by a same user). Alternatively, the media client and the user device may be associated with different users (e.g., the media client may be owned or leased by a first user and the user device may be owned or leased by a second user).

The user device may include a mobile phone, a tablet computer, a laptop computer, a mobile telephone, a desktop computer, and/or similar device. The media client may include a set-top box, a streaming device (e.g., an over-the-top (OTT) streaming device), a smart television (TV), and/or a computer. The media client communication system may include a device that enables user devices (e.g., the user device discussed herein) to interact with media clients (e.g., the media client discussed herein) using a message service. The media client communication system may perform various functions such as a message receiving function (e.g., receiving messages from the user device and from the media client), a message routing function (e.g., routing messages), an identifier validation function (e.g., validating client identifiers associated with messages and/or requests), and/or another function to enable user devices to control media clients, as described herein.

As shown in FIG. 1A, and by reference number 110, the media client communication system may receive a request to register the user device with the media client. For example, the media client communication system may receive the request to enable the user device to communicate with and control the media client via a message service (e.g., to enable the user device to control applications of the media client). The message service may be utilized in accordance with a messaging protocol that comprises a short message service (SMS) protocol, a rich communication service (RCS) protocol, a multimedia messaging service (MMS) protocol, and/or another messaging protocol.

In some implementations, the media client communication system may receive the request based on the media client initiating a media client application and, thereby, initiating an application session associated with the media client application. In some implementations, the media client application may be configured to be controlled via textual inputs. In some examples, the media client application may include a media streaming application (e.g., a movie streaming application, a music streaming application, and/or media streaming application), a home security application, a home automation application, and/or another application that may be used via the media client. As an example, the textual inputs may include a textual input including search criteria to perform a search, a textual input to provide a username and/or password for an application associated with the media client application, a textual input including characters to name one or more devices associated with the media client application, a textual input to control operations of media being provided for display (e.g., play, pause, rewind, fast forward, etc.). The media client application may cause the media client to transmit the request.

In some implementations, initiating the media client application may cause the media client to initiate a messaging application that enables user devices to control the media client (e.g., control the applications of the media client) via the message service. The messaging application (e.g., a registration feature of the messaging application) may cause the media client to transmit the request to the media client communication system.

In some examples, the media client communication system may provide the messaging application to the media client prior to receiving the request to register the user device with the media client. The messaging application may be associated with an application programming interface (API) that is configured to process messages associated with the messaging protocol (e.g., to enable the media client and the user to device to communicate in accordance with the messaging protocol). As an example, the API may include a REST (representational State Transfer) API. In some implementations, the media client communication system and the media client may communicate via the API. For example, the media client communication system and the media client may communicate via REST requests. For instance, the request (to register the user device with the media client) may include a REST request.

In some implementations, the request may include information identifying the media client and information indicating that the user device is to be registered with the media client to enable the user device to communicate with and control the media client via the message service. The information identifying the media client may include a serial number of the media client, a model number of the media client, information identifying a make/manufacturer of the media client, and/or a network address (e.g., a media access control address, an Internet protocol address, and/or a similar address).

As shown in FIG. 1A, and by reference number 120, the media client communication system may assign a client identifier (or client ID). For example, based on receiving the registration request, the media client communication system may perform the identifier validation function to determine whether a client identifier has been assigned to the media client. In some implementations, the client identifier may include a telephone number. Alternatively, the client identifier may include another identifier that may be used to enable communication between the media client and the user device in accordance with the messaging protocol discussed above.

When determining whether the client identifier has been assigned to the media client, the media client communication system may search a media client data structure that stores information identifying media clients in association with client identifiers. For example, information identifying a first media client may be stored in association with a first client identifier, information identifying a second media client may be stored in association with a second client identifier, and so on. When searching the media client data structure, the media client communication system may search the media client data structure using the information identifying the media client (included in the request to register the user device) to determine whether the media client data structure includes the information identifying the media client (e.g., stored in associated with a client identifier).

In some implementations, if the media client data structure includes the information identifying the media client (e.g., stored in associated with a client identifier), the media client communication system may transmit the client identifier to the media client to cause the media client to provide the client identifier for display (e.g., to the user of the media client). In this manner, the media client communication system may cause the media client to provide a first option to confirm use of the client identifier (currently assigned to the media client) or a second option to select another client identifier to be assigned to the media client. If the media client communication system receives an indication that the user has selected the first option, the media client communication system may determine that the client identifier is associated with the media client and may proceed to associating the client identifier with a messaging identifier of the user device, as described below in connection of reference number 130 of FIG. 1A. Alternatively, if the media client communication system receives an indication that the user has selected the second option, the media client communication system may proceed to assigning a client identifier, as described below.

In some implementations, when assigning a client identifier, the media client communication system may select the client identifier from a plurality of available client identifiers associated with the API. The plurality of available client identifiers may be stored in a client identifier (ID) registry. The client ID registry may be stored in one or more memories of the media client communication system. The plurality of available client identifiers may include a list of identifiers that are available to be assigned by the media client communication system (e.g., to media clients) and that may enable the media clients to communicate with user devices in accordance with the messaging protocol. For example, the plurality of available client identifiers may include a list of telephone numbers available to be assigned by the media client communication system. In some implementations, one or more client identifiers, of the plurality of available client identifiers, may be assigned to multiple media clients (including the media client). For example, a first client identifier may be assigned to multiple media clients at different times (e.g., the first client identifier may be reused by multiple media clients) and/or a second client identifier may be assigned to a single media client (e.g., the second client identifier may be dedicated to a single media client).

In some implementations, the media client communication system may automatically select (e.g., without intervention of the user of the media client) a client identifier for the media client. For example, the media client communication system may automatically select the client identifier based on an order of availability of the plurality of available client identifiers (e.g., a first available client identifier in a list including the plurality of available client identifiers). In some instance, the first available client identifier may correspond to a most recently available client identifier out of the plurality of available client identifiers. Additionally, or alternatively, to selecting the client identifier based on an order of availability, the media client communication system may automatically select the client identifier based on a frequency of usage (or frequency of assignment) of a particular client identifier. For example, the media client communication system may analyze historical data regarding assignments of client identifiers and identify a particular client identifier most frequently assigned to the media client. The historical data regarding assignments of client identifiers may be stored in one or more memories associated with the media client communication system.

In some implementations, the media client communication system may provide the plurality of available client identifiers to the media client to cause the media client to provide the plurality of available client identifiers to the user. In some example, the media client communication system may cause the plurality of available client identifiers to be provided in an order that is based on recency of availability, frequency of usage, recency of usage, and/or another similar criterion. The user may select an available client identifier, from the plurality of available client identifiers, using the media client and the media client communication system receive, from the media client, information identifying the available client identifier selected by the user.

The media client communication system may assign the available client identifier (e.g., selected by the media client communication system or by the user) as the client identifier for the media client. As an example, the media client communication system may store, in the media client data structure, the information identifying the media client in association with the client identifier. The media client communication system may determine that the client identifier is associated with the media client and may proceed to associate the client identifier with a messaging identifier of the user device, as described below in connection of reference 130 of FIG. 1A.

As shown in FIG. 1A, and by reference number 130, the media client communication system may map the client identifier (or client ID) with a messaging identifier (or messaging ID). For example, assume that the media client communication system has determined that the client identifier has been assigned to the media client (e.g., the client identifier is associated with the media client). Based on determining that the client identifier has been assigned to the media client, the media client communication system may prompt the user (of the media client) for the messaging identifier of the user device (with which the media client is to be associated). The messaging identifier may include a telephone number. Alternatively, the messaging identifier may include another identifier that may be used to enable communication between the media client and the user device in accordance with the messaging protocol discussed above.

In some implementations, the media client communication system may cause the media client to provide a first option to obtain the messaging identifier of the user device via a text input mechanism (e.g., keyboard interface of the media client application or the messaging application) and a second option to obtain the messaging identifier of the user device via one or more messages (e.g., in accordance with the messaging protocol) from the user device.

If the media client communication system receives (from the media client) information indicating that the first option has been selected, the media client communication system may transmit a messaging identifier request to the media client to obtain the messaging identifier of the user device via the keyboard interface. For example, the media client communication system may cause the media client to provide the text input mechanism (e.g., the keyboard interface) and obtain the messaging identifier via the text input mechanism (e.g., the keyboard interface). In some instances, the user may provide the messaging identifier to replace an existing messaging identifier.

The media client communication system may receive the messaging identifier (obtained via the keyboard interface) from the media client. The media client communication system may store information regarding the user device in association with information regarding the media client in a registration data structure, thereby mapping the client identifier with the messaging identifier. The information regarding the user device (hereinafter referred to as "user device information") may include the messaging identifier of the user device). The information regarding the media client (hereinafter referred to as "media client information") may include the client identifier and/or the information identifying the media client (discussed above). The registration data structure may be stored in one or more memories of the media client communication system.

The media client communication system may transmit, to the media client, a notification indicating that the client identifier has been mapped with the messaging identifier. The media client communication system may transmit a confirmation message to the user device to confirm whether the user of the user device desires the user device to be associated with the media client for the purpose of the user device controlling and/or communicating with the media client using the messaging protocol. The media client communication system may transmit the confirmation message, using the messaging identifier, in accordance with the messaging protocol. Based on transmitting the confirmation message, the media client communication system may receive, from the user device, an acceptance message confirming that the user device is to be associated with the media client or an opt-out request indicating that the user device is not to be associated with the media client. The opt-out request may include the message identifier of the user device, the client identifier of the media client, and information indicating that the user device is not to be associated with the media client.

If the media client communication system receives the opt-out request, the media client communication system may analyze (or parse) the opt-out request to identify the client identifier. The media client communication system may perform the identifier validation function to determine whether the client identifier is assigned to the media client, in a manner similar to the manner described above. Assume that the media client communication system validates the client identifier, the media client communication system may search the registration data structure to identify information regarding the mapping of the client identifier with the messaging identifier. The media client communication system may delete (or clear), from the registration data structure, the information regarding the mapping of the client identifier with the messaging identifier. Additionally, the media client communication system may delete (or clear), from the media client data structure, the information identifying the media client in association with the client identifier.

In some implementations, after deleting the information above from the registration data structure and from the media client data structure, the media client communication system may provide a notification that the information above has been deleted from the registration data structure and from the media client data structure and may cause the media client to provide information regarding the notification. The information regarding the notification may include the media client information and the user device information.

If the media client communication system receives (from the media client) information indicating that the second option (obtain the messaging identifier of the user device via one or more messages) has been selected, the media client communication system may perform actions to obtain the messaging identifier of the user device via one or more messages, as described in below in connection with FIG. 2. In some implementations, the media client communication system may generate a unique authentication code. The authentication code may include alphanumeric characters generated by the media client communication system. The media client communication system may generate authentication codes based on a trigger (e.g., based on a request to register one or more user devices) and/or periodically (e.g., every second, every minute, and another period of time). The media client communication system may store, in an authentication data structure (in one or more memories associated with the media client communication system), the authentication code in association with the user device information. The media client communication system may provide the authentication code to the media client to cause the media client to display the authentication code.

The media client communication system may transmit, to the user device and using the messaging identifier, a message in accordance with the messaging protocol. The message may include an authentication request that requests the authentication code provided to the media client. Based on transmitting the authentication request, the media client communication system may receive, from the user device, a response message (or authentication message) in accordance with the messaging protocol. The response message may include a code (e.g., the authentication code), the user device information device, and/or the user device information. In some implementations, the media client communication system may store the response message in an authentication response data structure (that is stored in one or more memories associated with the media client communication system).

The media client communication system may parse the response message to obtain the messaging identifier and perform a lookup in the registration data structure, using the messaging identifier, to identify the client identifier. If the registration data structure does not include the information indicating the mapping of the client identifier with the messaging identifier, the media client communication system may transmit an error message to the user device. Alternatively, the media client communication system may cause the user device to be registered with the media client, as described above. Assume that the registration data structure includes the mapping. The media client communication system may perform the identifier validation function to determine whether the client identifier is assigned to the media client, in a manner similar to the manner described above. Assume the client identifier has been validated. The media client communication system may search the authentication data structure, using the client identifier, to determine if the authentication data structure includes the authentication code associated with the client identifier. If the media client communication system does not locate the authentication code in the authentication data structure, the media client communication system may transmit an invalid code message to the user device in accordance with the messaging protocol. The invalid code message may indicate that the code (transmitted by the user device) is invalid.

If the media client communication system identifies the authentication code in the authentication data structure, the media client communication system may obtain the response message, from the authentication response data structure, and analyze (or parse) the response message to identify the code. The media client communication system may compare the authentication code and the code. If the authentication code does not match the code, the media client communication system may transmit an invalid code message to the user device, as described above. If the authentication code matches the code, the media client communication system may transmit a valid code message to the user device in accordance with the messaging protocol. The valid code message may indicate that the code (transmitted by the user device) is valid. The valid code message may include information providing an opt-out option.

Based on transmitting the valid code message, the media client communication system may receive, from the user device, an acceptance message confirming that the user device is to be associated with the media client or an opt-out request indicating that the user device is not to be associated with the media client, in a manner similar to the manner described above.

The media client communication system may store the user device information in association with the media client information and/or the authentication code in the registration data structure, thereby mapping the client identifier with the messaging identifier, as explained above. The media client communication system may map the client identifier with the messaging identifier based on the authentication code matching the code and/or based on receiving the acceptance message. In some implementations, the media client communication system may transmit, to the media client, a notification indicating that the client identifier has been mapped with the messaging identifier, as described above.

In some implementations, the media client communication system may enable a single messaging identifier to be associated with multiple media clients. For example, the media client communication system may obtain the messaging identifier as described herein (e.g., via the text input mechanism or via the one or more messages from the user device) and may search the registration data structure using the messaging identifier. The media client communication system may obtain, from the registration data structure, information indicating that the messaging identifier is mapped to another client identifier (e.g., a second client identifier) of another media client (e.g., a second media client). The media client communication system may prompt the user to select a different messaging identifier for the media client or select the messaging identifier to confirm that the messaging identifier is to be associated with the client identifier of the media client in addition to the messaging identifier being associated with the second media identifier of the second media client. Alternatively, or alternatively, the media client communication system may prompt the user to select a different messaging identifier for the second media client.

Assume that the media client communication system receives an indication that the user has selected the messaging identifier (to be associated with the client identifier of the media client). The media client communication system may store the user device information (e.g., the messaging identifier) in association with the media client information (e.g., the client identifier) in the registration data structure, as described above. In this regard, the media client communication system may map the messaging identifier with the client identifier in addition to the messaging identifier being mapped with the second client identifier. In some examples, the registration data structure may, accordingly, store multiple entries including the messaging identifier.

In some implementations, after the client identifier has been mapped with the messaging identifier, the media client communication system may receive an opt-out request from the user device. Based on receiving the opt-out request from the user device, the media client communication system may perform the actions to remove any association between the user device and the media client, in a manner similar to the manner described above.

In some implementations, the media client communication system may store information regarding the application session associated with the media client application (hereinafter "session registration information") in a session management data structure. The session registration information may include the user device information, information identifying the media client application, and information identifying the application session. The session management data structure may be stored in one or more memories associated with the media client communication system. The session management data structure may store information regarding applications associated with different media clients. In some implementations, the media client communication system may transmit a user session confirmation message to the user device (in accordance with the messaging protocol). The user session confirmation message may indicate that the user device may provide textual input for the application session. The media client communication system may provide a client session confirmation message (via the API) to the media client. The client session confirmation message may include the session registration information and may indicate that the user device may provide textual input for the application session.

As shown in FIG. 1B, and by reference number 140, the media client communication system may receive a message intended for the media client. For example, after mapping the client identifier with the messaging identifier, the media client communication system may receive the message (associated with the media client) from the user device in accordance with the messaging protocol, as described above. In some implementations, the message may include the user device information, the media client information, input (or input data) for the application session. The input may include textual content submitted using the user device. The application session may be associated with the media client application, as described above. In some implementations, the input may be used to control the media application, as described above.

As shown in FIG. 1B, and by reference number 150, the media client communication system may determine that the user device is associated with the media client based on a registration mapping and a messaging identifier. For example, based on receiving the message intended for the media client, the media client communication system may analyze (or parse) the message to identify the messaging identifier and perform a lookup in the registration data structure, using the messaging identifier, to identify the client identifier. If the registration data structure does not include the information indicating the registration mapping (of the client identifier with the messaging identifier), the media client communication system may transmit the error message to the user device. Alternatively, the media client communication system may cause the user device to be registered with the media client, as described above. Assume that the registration data structure includes the mapping. The media client communication system may perform the identifier validation function to determine whether the client identifier is assigned to the media client, in a manner similar to the manner described above. If the client identifier is not validated, the media client communication system may transmit an error message to the user device (e.g., indicating that the request, from the user device, could not processed). Alternatively, the media client communication system may cause the user device to be registered with the media client, as described above.

In some implementations, the media client communication system may search the registration data structure using the messaging identifier and determine that the messaging identifier is associated with multiple media clients. For example, the media client communication system may determine that the registration data structure stores the registration mapping of the client identifier with the messaging identifier, a second mapping of the second client identifier (of the second media client) with the messaging identifier, and so on. In this regard, the media client communication system may identify a particular media client, out of the multiple media clients, as an intended recipient of the message from the user device.

In some implementations, the media client communication system may identify a particular media client, out of the multiple media clients, with which the messaging identifier was most recently used. In some examples, the registration data structure may include, for the mappings, information identifying a time and/or a date of a last use of the messaging identifier for interactions with a respective media client of the multiple media clients. The media client communication system may identify the media client as a particular media client with which the messaging identifier was most recently used based on the information identifying the time and/or the date of a last use of the messaging identifier.

Additionally, or alternatively, to identifying a particular media client with which the messaging identifier was most recently used, the media client communication system may determine a capability associated with the multiple clients. For example, the media client communication system may analyze the input to identify a capability (e.g., a media client application) associated with the input included in the message (e.g., identify a media client application or a type of media application associated with the input). The media client communication system may search, using information identifying the capability, a data structure (e.g., the registration data structure) to identify a particular media client associated with the capability. For example, the data structure may store the media client information and the media client information may include information identifying one or more capabilities (e.g., one or more media client applications) associated with a respective media client. The media client communication system may compare the information identifying the capability (from the message) and the information identifying the one or more capabilities of a respective media client out of the multiple media clients. Based on the comparison, the media client communication system may identify the media client as a particular media client with a capability that matches (or more close matches) the capability associated with the input included in the message.

Additionally, or alternatively, to identifying a particular media client with a capability associated with the input, the media client communication system may determine an availability of the multiple media clients. For example, the media client communication system may search a data structure (e.g., the registration data structure) to identify a particular media client that is available (e.g., a particular media client that is powered on and/or that is active and is communicating with a network associated with the media client communication system). In some instances, the data structure may store information indicating whether a respective media client (of the multiple media clients) is available. Based on searching the data structure, the media client communication system may identify the media client as a particular media client that is available. In the example herein, assume that the media client communication system identifies the media client (out of the multiple media clients) as the intended recipient for the message.

As explained above, assume that the registration data structure includes the information indicating the registration mapping, the media client communication system may search the session management data structure using the client identifier and/or the messaging identifier to determine whether the session management data structure stores the session registration information discussed above and described below in connection with FIG. 3. If the session management data structure does not include the session registration information, the media client communication system may transmit the error message to the user device. Alternatively, the media client communication system may cause the user device to be registered with the media client, as described above.

As shown in FIG. 1B, and by reference number 160, the media client communication system may route/provide input data from the message to the media client. For example, assume that the session management data structure includes the session registration information. The media client communication system may provide the message to the media client to cause the media application to be controlled based on the input included in the message. For instance, based on the session registration information, the media client communication system may cause the media client to provide the input to the media client application (identified by the message) to cause the media client application to be controlled based on the input. The media client application may process the input, thereby causing the media client application to perform an action.

In some implementations, if the session registration information does not include information identifying an application, the media client may process the input, thereby causing the media client to perform an action. In some implementations, the media client communication system may provide a transmission message to the user device. The transmission message may indicate that the input has been provided to the media client application and/or to the media client.

As shown in FIG. 1C, and by reference number 170, the media client communication system may receive status data. For example, after providing the input (from the message received from the user device) to the media client, the media client communication system may receive the status data (associated with the application session) from the media client. The status data may include the user device information, the media client information, and/or the session registration information.

In some implementations, the status data may be associated with a confirmation that the input data was received and/or that an action, associated with the input data, has been performed. Additionally, or alternatively, the status data may be associated with the session registration information. For example, the status data may indicate that the application session is open (or active) and that the media client is ready to obtain input, associated with the application session, from the user device. Additionally, or alternatively, the status data may be associated with an application output associated with the input being processed during the application session. Additionally, or alternatively, the status data may be associated with a request for additional input data for the application session. In some examples, the request (for additional input data) may indicate or specify a type of input that should be returned (or provided) by the user device.

In some implementations, the status data may indicate that the application session has ended. Based on receiving the status data indicating that the application session has ended, the media client communication system may delete information from the session management data structure.

As shown in FIG. 1C, and by reference number 180, the media client communication system may determine that the user device is associated with the media client based on the mapping (of the client identifier with the messaging identifier) and the client identifier (included in the status data). For example, assume that the media client communication system analyzes the status data to determine that the status data requires additional input from the user device. Based on determining that the status data requires additional input from the user device, the media client communication system may search the registration data structure (e.g., using the client identifier and/or the messaging identifier) to determine whether the registration data structure includes information regarding the mapping.

Assume that the registration data structure includes the information regarding the mapping. The media client communication system may determine that the user device is associated with the media client based on the registration data structure including the information regarding the mapping.

In some implementations, based on searching the registration data structure using the messaging identifier, the media client communication system may determine that the messaging identifier is associated with multiple media clients. For example, the media client communication system may determine that the registration data structure stores the mapping of the client identifier with the messaging identifier, stores the second mapping of the second client identifier (of the second media client) with the messaging identifier, and so on. In some examples, the media client communication system may update the mapping (of the client identifier with the messaging identifier) to indicate that the media client is an active media client (e.g., a media client that is currently interacting with the user device by way of the messaging identifier), update the second mapping (of the second client identifier with the messaging identifier) to indicate that the second media client is an inactive media client (e.g., a media client that is not currently interacting with the user device by way of the messaging identifier), and so on. In some implementations, the media client communication system may cause the media client to provide, for display, a message indicating the media client is active, may cause the second media client to provide, for display, a message indicating the second media client is inactive, and so on.

As shown in FIG. 1C, and by reference number 190, the media client communication system may send the message with the status data to the user device. For example, based on determining that the user device is associated with the media client, the media client communication system may generate a message (e.g., a text message) including the status data. The media client communication system may transmit the message to the user device, in a manner similar to the manner described above. The message may include information identifying a type of input that should be returned (or provided) by the user device.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
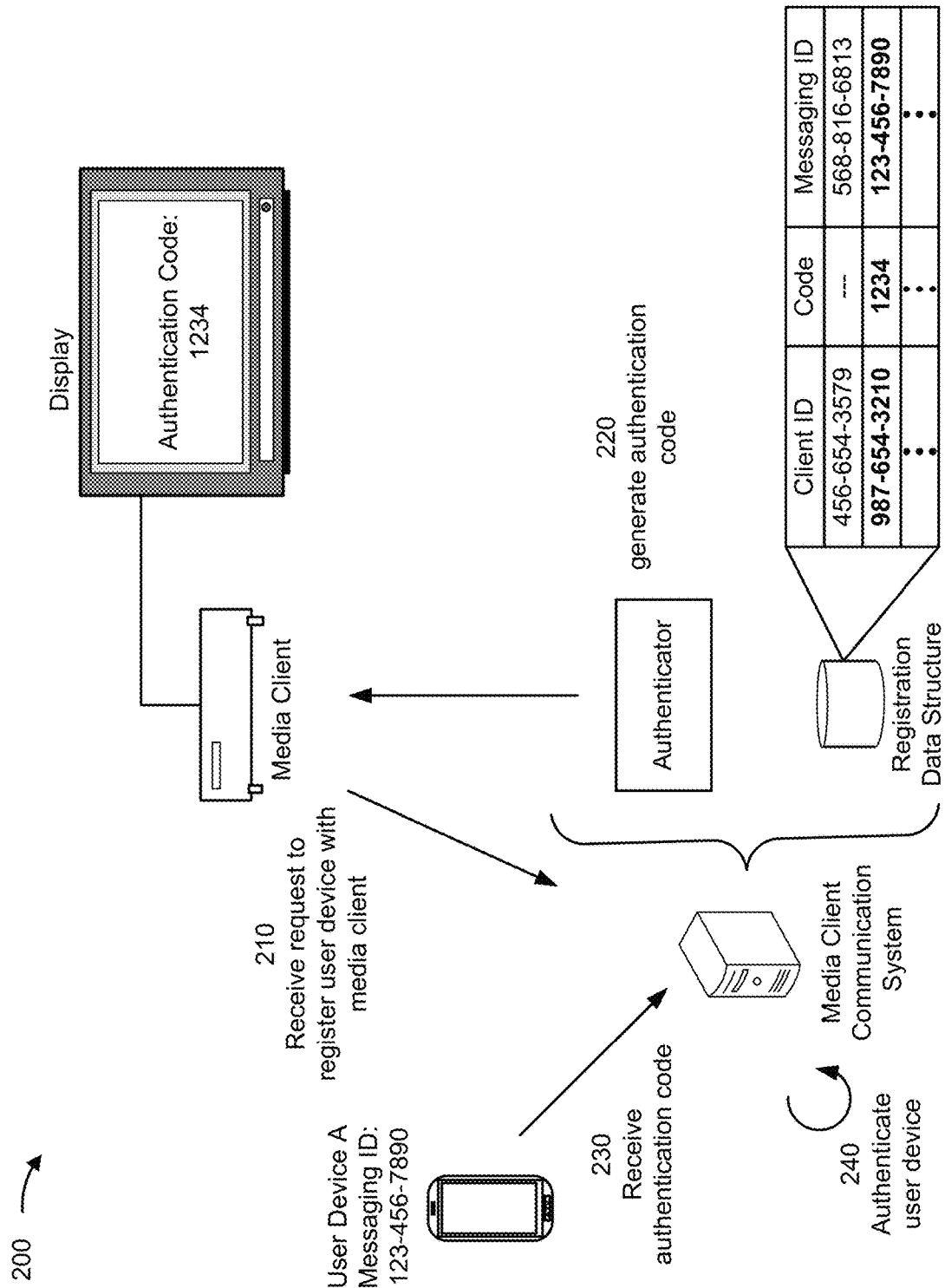
FIG. 2 is a diagram of an example implementation described herein.

FIG. 2 is a diagram of an example implementation 200 described herein. Example implementation 200 may be associated with controlling a media client using a message service. As shown in FIG. 2, example implementation 200 includes a user device, a media client, and a media client communication system. The user device, the media client, and the media client communication system have been described above in connection with FIGS. 1A-1C. Example implementation 200 may be associated with authenticating the user device as part of a process for registering the user device with the media client, as described above.

As shown in FIG. 2, and by reference number 210, the media client communication system may receive a request to register the user device with the media client. For example, the media client communication system may receive the request, from the media client, to register the user device with the media client, in a manner similar to the manner described above in connection with FIG. 1A.

As shown in FIG. 2, and by reference number 220, the media client communication system may provide an authentication code. For example, based on receiving the request, the media client communication system may generate the authentication code, in a manner similar to the manner described above. For instance, the media client communication system may include an element (e.g., an authenticator) that generates the authentication code. The media client communication system may provide the authentication code to the media client to cause the media client to provide the authentication code via a display.

As shown in FIG. 2, and by reference number 230, the media client communication system may receive the authentication code. For example, the media client communication system may receive a message (e.g., a text message including a code (e.g., the authentication code)) from the user device, in a manner similar to the manner described above in connection with FIG. 1A.

As shown in FIG. 2, and by reference number 240, the media client communication system may authenticate the user device. For example, the media client communication system may authenticate the user device based on comparing the authentication code (received from the user device) and the authentication code (generated by the authenticator), in a manner similar to the manner described in connection with FIG. 1A. Based on authenticating the user device, the media client communication system may cause the user device to be registered with the media client, in a manner similar to the manner described in connection with FIG. 1A.

As indicated above, FIG. 2 is provided as an example. Other examples may differ from what is described with regard to FIG. 2. The number and arrangement of devices shown in FIG. 2 is provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
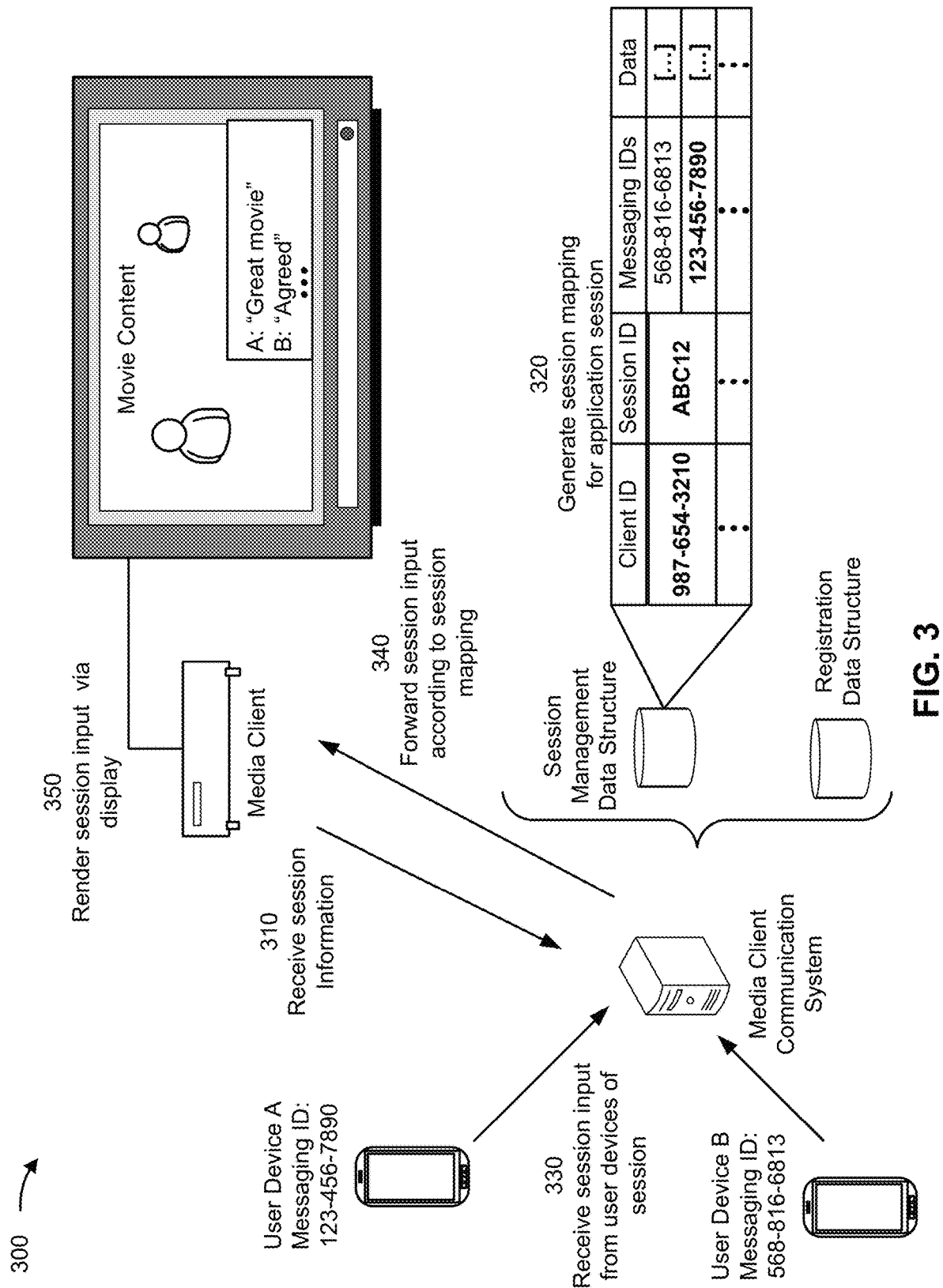
FIG. 3 is a diagram of an example implementation described herein.

FIG. 3 is a diagram of an example implementation 300 described herein. As shown in FIG. 3, example implementation 300 includes a first user device (e.g., user device A), a second user device (e.g., user device B), a media client, and a media client communication system. The first user device, the second user device, the media client, and the media client communication system have been described above in connection with FIGS. 1A-1C. Example implementation 300 may be associated with the first user device communicating with the second user device, using a message service (as part of a chat session), via the media client.

Assume that a first user of the first user device and a second user of the second user device are watching a movie. Further assume that movie content, of the movie, is provided by the media client via a display, as shown in FIG. 3. Further assume that the media client is associated with the first user (e.g., the media client is located in a home of the first user). Further assume that the first user device and the second user device have been registered with the media client, in a manner similar to the manner described above in connection with FIG. 1A.

As shown in FIG. 3, and by reference number 310, the media client communication system may receive session information. For example, the media client communication system may receive, from the media client, the session information. The session information may include information identifying a client application (e.g., a movie streaming application, a client identifier (as described above) of the media client, a messaging identifier (as described above) of the first user device, and information indicating that a chat session (in accordance the messaging protocol described above) should be initiated in conjunction with the client application.

In some implementations, the session information may include a messaging identifier of the second user device. Alternatively, based on receiving the session information, the media client communication system may obtain a list of messaging identifiers of user devices associated with contacts of the first user. For example, the media client communication system may obtain the list of messaging identifiers from a contacts data structure (e.g., stored in one or more memories of the media client communication system) and may provide the list of messaging identifiers (including the messaging identifier of the second user device) to the media client for display. Based on providing the list of messaging identifiers, the media client communication system may receive, from the media client, an indication that the messaging identifier of the second user device has been selected.

As shown in FIG. 3, and by reference number 320, the media client communication system may generate a session mapping for an application session. For example, based on receiving the session information, the media client communication system may generate a session identifier associated with the chat session. The media client communication system may store, in a session management data structure, the client identifier in association with the session identifier, the messaging identifier of the first user device, and the messaging identifier of the second user device. Accordingly, the media client communication system may generate a session mapping between the media client, the first user device, and the second user device.

As shown in FIG. 3, and by reference number 330, the media client communication system may receive session input from user devices of the session. For example, the media client communication system may receive session input from the first user device and from the second user device. For instance, the media client communication system may receive a first message including a first user input from the first user device and a second message including a second user input from the second user device, in a manner similar to the manner described above in connection with FIGS. 1A-1C. The first message may include the first input, the messaging identifier of the first user device, and the client identifier of the media client. The second message may include the second input, the messaging identifier of the second user device, and the client identifier of the media client.

As shown in FIG. 3, and by reference number 340, the media client communication system may forward session input according to the session mapping. For example, the media client communication system may process the first message and the second message in a manner similar to the manner described above in connection FIGS. 1A-1C. For example, with respect to the first message, the media client communication system may search the session management data structure using the messaging identifier of the first user device and/or the client identifier of the media client to identify the session mapping. The media client communication system may perform a similar with respect to the second message.

As shown in FIG. 3, and by reference number 350, the media client communication system may render the session input via a display. For example, based on identifying the session mapping, the media client communication system may provide the first input to the media client for display and may provide the second input to the media client for display, as shown in FIG. 3. In some implementations, the first input may be provided with information identifying the first user and the messaging identifier of the first user device and the second input may be provided with information identifying the second user and the messaging identifier of the second user device.

As indicated above, FIG. 3 is provided as an example. Other examples may differ from what is described with regard to FIG. 3. The number and arrangement of devices shown in FIG. 3 is provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
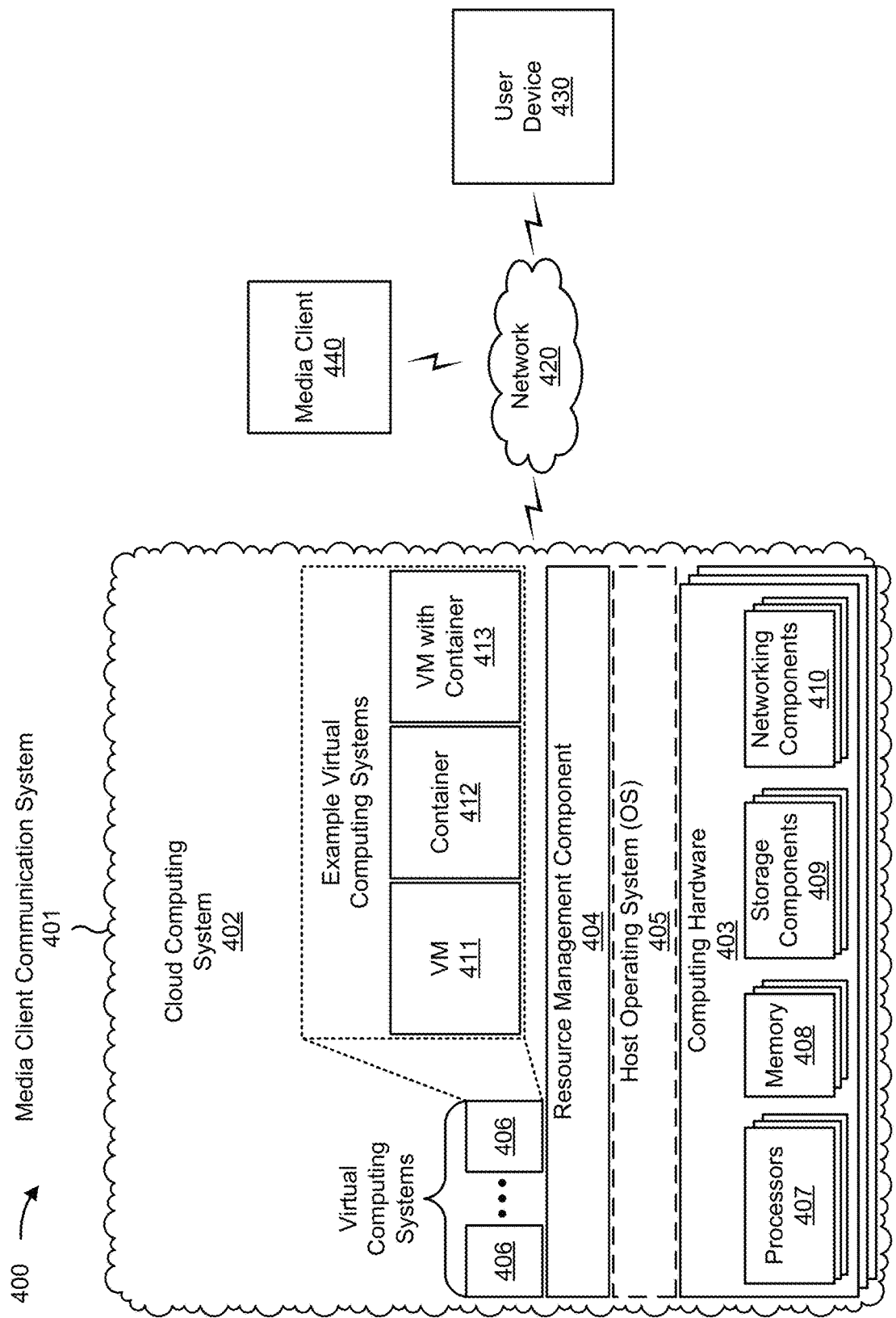
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a media client communication system 401, which may include one or more elements of and/or may execute within a cloud computing system 402. The cloud computing system 402 may include one or more elements 403-413, as described in more detail below. As further shown in FIG. 4, environment 400 may include a network 420, a user device 430, and/or a media client 440. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409, and/or one or more networking components 410. Examples of a processor, a memory, a storage component, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications using a file system that includes binary files, software libraries, and/or other resources required to execute applications on a guest operating system (e.g., within the virtual computing system 406) or the host operating system 405.

Although the media client communication system 401 may include one or more elements 403-413 of the cloud computing system 402, may execute within the cloud computing system 402, and/or may be hosted within the cloud computing system 402, in some implementations, the media client communication system 401 may not be cloud-based (e.g., may be implemented outside of a cloud computing system) or may be partially cloud-based. For example, the media client communication system 401 may include one or more devices that are not part of the cloud computing system 402, such as device 500 of FIG. 5, which may include a standalone server or another type of computing device. In some implementations, the media client communication system 401 may implemented as a serverless cloud environment. The media client communication system 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

User device 430 includes one or more devices capable of receiving, generating, storing, processing, and/or providing information, as described elsewhere herein. User device 430 may include a communication device and/or a computing device. For example, user device 430 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 430 may communicate with one or more other devices of environment 400, as described elsewhere herein.

Media client 440 includes a device capable of receiving, transmitting, and/or processing multimedia content and providing the multimedia content to a user (e.g., via a display device). Examples of media client 440 may include a set-top box, a streaming device (e.g., an over-the-top (OTT) streaming device), a smart television (TV), a computer, a cable card, a gaming device, a portable electronic device, and/or other types of devices capable of receiving, transmitting, and/or processing multimedia content and providing the multimedia content to a user.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
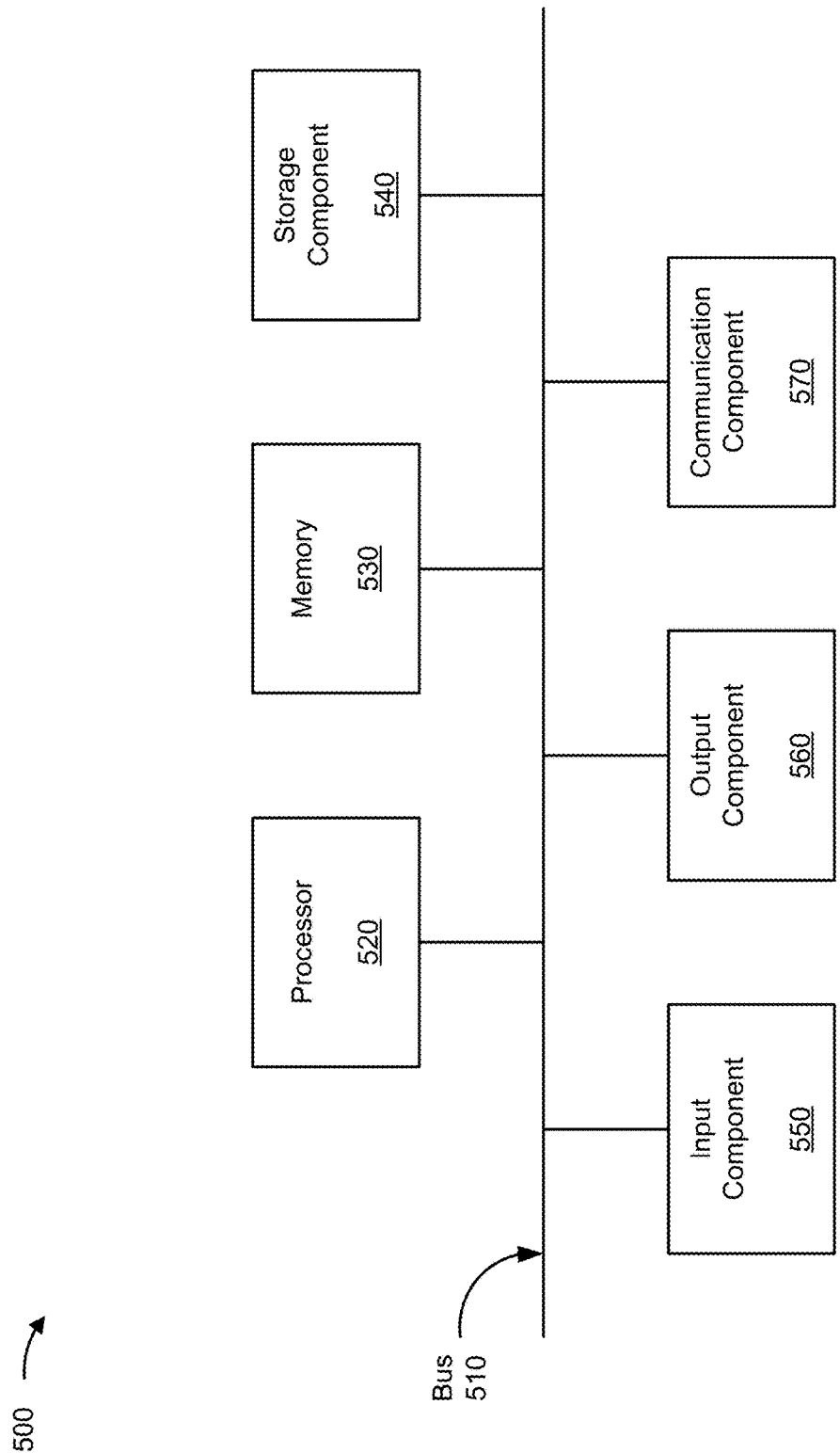
FIG. 5 is a diagram of example components of one or more devices of FIG. 4.

FIG. 5 is a diagram of example components of a device 500, which may correspond to a media client communication system 401, a user device 430, and/or a media client 440. In some implementations, a media client communication system 401, a user device 430, and/or a media client 440 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
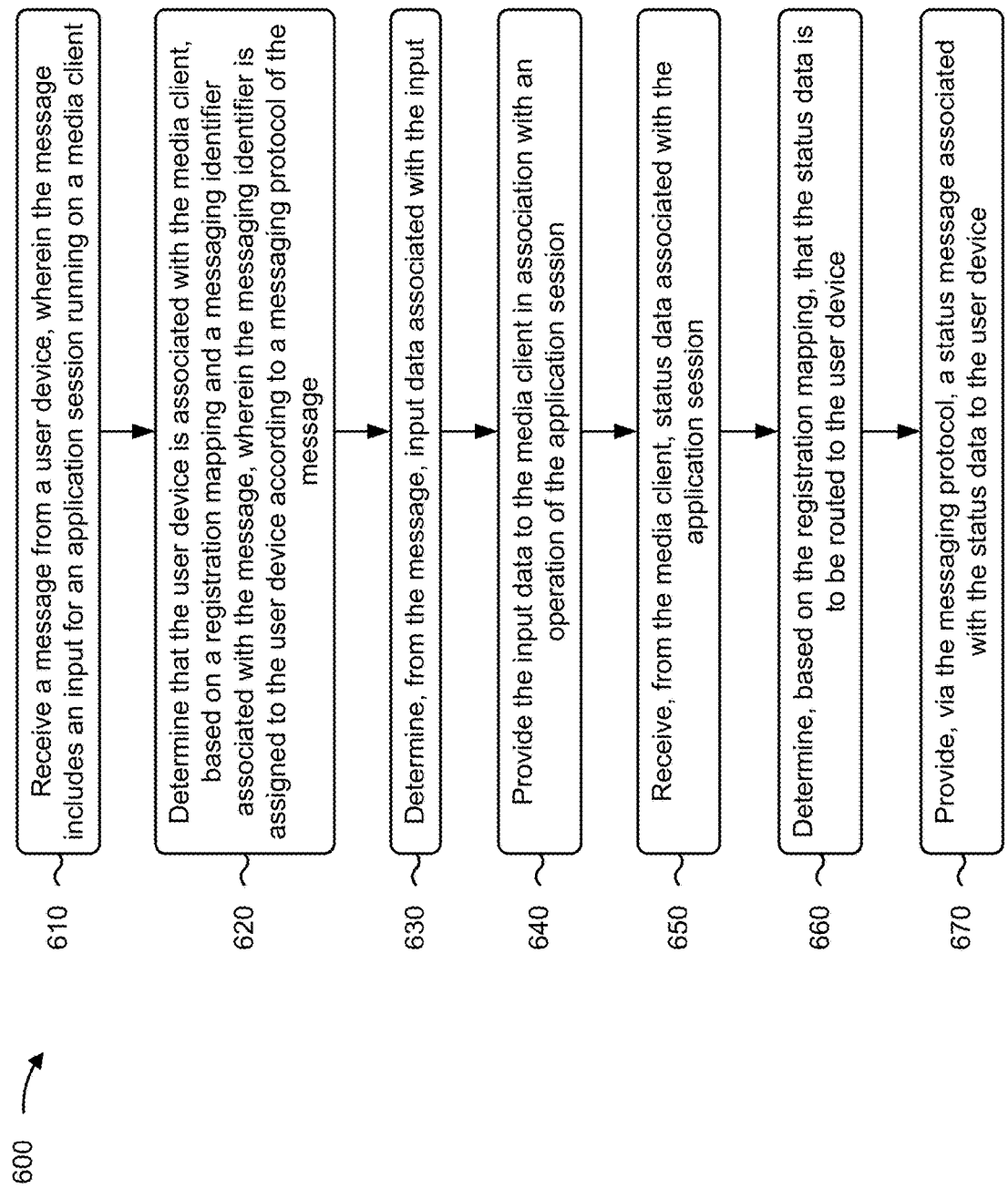
FIG. 6 is a flowchart of an example process controlling a media client using a message service.

FIG. 6 is a flowchart of an example process 600 associated with controlling a media client using a message service. In some implementations, one or more process blocks of FIG. 6 may be performed by a media client communication system (e.g., media client communication system 401). In some implementations, one or more process blocks of FIG. 6 may be performed by another device or a group of devices separate from or including the media client communication system, such as a user device (e.g., user device 430) and/or a media client (e.g., media client 440). Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include receiving a message from a user device, wherein the message includes an input for an application session running on a media client (block 610). For example, the media client communication system may receive a message from a user device, as described above. In some implementations, the message includes an input for an application session running on a media client. The input may be associated with a user interface of the application session.

In some implementations, prior to receiving the message, the media client communication system may receive a registration request that identifies the messaging identifier and a client identifier of the media client, authenticate the user device based on sending an authentication request to the user device and receiving an authentication response from the user device, and generate the registration mapping that associates the client identifier with the messaging identifier.

As further shown in FIG. 6, process 600 may include determining that the user device is associated with the media client, based on a registration mapping and a messaging identifier associated with the message, wherein the messaging identifier is assigned to the user device according to a messaging protocol of the message (block 620). For example, the media client communication system may determine that the user device is associated with the media client, based on a registration mapping and a messaging identifier associated with the message, as described above.

In some implementations, the messaging identifier is assigned to the user device according to a messaging protocol of the message. The media client may be determined to be associated with the user device based on using an application programming interface configured to process messages associated with the messaging protocol. The registration mapping may map the messaging identifier to a client identifier of the media client. The client identifier may be assigned to the media client according to the messaging protocol. The messaging protocol may include a text messaging protocol and/or a rich communication services messaging protocol.

As further shown in FIG. 6, process 600 may include determining, from the message, input data associated with the input (block 630). For example, the media client communication system may determine, from the message, input data associated with the input, as described above.

As further shown in FIG. 6, process 600 may include providing the input data to the media client in association with an operation of the application session (block 640). For example, the media client communication system may provide the input data to the media client in association with an operation of the application session, as described above.

As further shown in FIG. 6, process 600 may include receiving, from the media client, status data associated with the application session (block 650). For example, the media client communication system may receive, from the media client, status data associated with the application session, as described above. The status data may be associated with a confirmation that the input data was received, session information associated with the application session, an application output associated with the input being processed during the application session, and/or a request for additional input data for the application session.

As further shown in FIG. 6, process 600 may include determining, based on the registration mapping, that the status data is to be routed to the user device (block 660). For example, the media client communication system may determine, based on the registration mapping, that the status data is to be routed to the user device, as described above.

As further shown in FIG. 6, process 600 may include providing, via the messaging protocol, a status message associated with the status data to the user device (block 670). For example, the media client communication system may provide, via the messaging protocol, a status message associated with the status data, as described above.

Process 600 may include additional implementations, such as any single implementation or any combination of implementations described in connection with one or more other processes described elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
　receiving, by a device, a first message from a first user device,
　　wherein the first message includes an input for an application session running on a media client,
　　wherein the media client is a set top box;
　determining, by the device, that the first user device is associated with the media client, based on a registration mapping, stored in a registration data structure, and a first messaging identifier associated with the first message,
　　wherein the first messaging identifier is assigned to the first user device according to a messaging protocol of the first message;
　determining, by the device and from the first message, input data associated with the input;
　providing, by the device, the input data to the media client in association with an operation of the application session;
　receiving, by the device and from the media client, first status data associated with the application session;
　determining, by the device and based on the registration mapping, that the first status data is to be routed to the first user device;
　providing, by the device and via the messaging protocol, the first message from the first user device and a second message from a second user device for display via the media client;

providing, by the device and via the messaging protocol, a status message associated with the first status data to the first user device;
receiving, from the media client, second status data that indicates that the application session has ended; and
clearing, by the device, the registration mapping from the registration data structure.

2. The method of claim 1, wherein the media client is determined to be associated with the first user device using an application programming interface configured to process messages associated with the messaging protocol.

3. The method of claim 1, wherein the input is associated with a user interface of the application session.

4. The method of claim 1, further comprising:
prior to receiving the first message, receiving a registration request that identifies the first messaging identifier and a client identifier of the media client;
authenticating the first user device based on sending an authentication request to the first user device and receiving an authentication response from the first user device;
and generating the registration mapping that associates the client identifier with the first messaging identifier.

5. The method of claim 1, wherein the registration mapping maps the first messaging identifier to a client identifier of the media client.

6. The method of claim 5, wherein the client identifier is assigned to the media client according to the messaging protocol.

7. The method of claim 1, wherein the first status data is associated with at least one of:
a confirmation that the input data was received;
session information associated with the application session;
an application output associated with the input being processed during the application session; or
a request for additional input data for the application session.

8. A device, comprising:
one or more memories; and
one or more processors, coupled to the one or more memories, configured to:
receive a registration request associated with associating a media client with a first user device,
wherein the media client is a set top box;
generate, based on the registration request, a registration mapping that maps a client identifier of the media client with a first messaging identifier of the first user device,
wherein the first messaging identifier is assigned to the first user device according to a messaging protocol and the client identifier is assigned to the media client according to the messaging protocol;
store the registration mapping in a registration data structure;
receive, via the messaging protocol, a first message from the first user device,
wherein the first message includes an input for an application session running on the media client;
determine that the first message is associated with the first user device based on the first message including the first messaging identifier;
route the first message to the media client based on the first message including the first messaging identifier and the registration mapping;

provide, via the messaging protocol, the first message from the first user device and a second message from a second user device for display via the media client;
receive, from the media client, status data that indicates that the application session has ended; and
clear the registration mapping from the registration data structure.

9. The device of claim 8, wherein the registration data structure is associated with an application programming interface that is configured to process communications between the media client and the first user device according to the messaging protocol.

10. The device of claim 9, wherein the one or more processors are further configured to:
prior to generating the registration mapping, select the client identifier from a plurality of available messaging identifiers associated with the application programming interface,
wherein the available messaging identifiers are associated with the messaging protocol; and
assign the client identifier to the media client.

11. The device of claim 8, wherein the client identifier is assigned to the media client based on the application session being initiated.

12. The device of claim 8, wherein the one or more processors are further configured to:
prior to generating the registration mapping, authenticate the first user device based on:
sending, in an authentication request, an authentication code to the first user device via the messaging protocol, and
receiving, in an authentication response, the authentication code from the first user device via the messaging protocol.

13. The device of claim 8, wherein the one or more processors are further configured to:
prior to routing the first message to the media client, look up the first messaging identifier in the registration data structure;
identify the registration mapping based on the first messaging identifier; and
identify the client identifier based on the registration mapping.

14. The device of claim 8, wherein the messaging protocol comprises at least one of:
a short message service (SMS) protocol;
a rich communication service (RCS) protocol; or
a multimedia messaging service (MMS) protocol.

15. A non-transitory computer-readable medium storing a set of instructions, the set of instructions comprising:
one or more instructions that, when executed by one or more processors of a device, cause the device to:
generate a registration mapping that associates a client identifier of a media client and a first messaging identifier of a first user device,
wherein the media client is a set top box;
store the registration mapping in a registration data structure;
receive, via a messaging protocol, a first message from the first user device,
wherein the first message includes the first messaging identifier and an input for an application session of the media client;
determine, based on the registration data structure including the registration mapping and the first message, that the first user device is associated with the media client;

provide, via the messaging protocol, the first message from the first user device and a second message from a second user device for display via the media client;

provide, via the messaging protocol, the first message to the media client to permit the application session to operate according to the input;

receive, from the media client, status data that indicates that the application session has ended; and clear the registration mapping from the registration data structure.

16. The non-transitory computer-readable medium of claim 15, wherein the one or more instructions further cause the device to:

prior to generating the registration mapping, receive a registration request from the media client,
wherein the registration request identifies the first messaging identifier;

obtain the client identifier from a list of available client identifiers that are associated with the messaging protocol; and assign the client identifier to the media client.

17. The non-transitory computer-readable medium of claim 15, wherein the one or more instructions further cause the device to:

prior to generating the registration mapping, receive, from the media client, a registration request that identifies the first messaging identifier;

obtain an authentication code;

provide the authentication code to the media client to permit the media client to present the authentication code via a display;

receive the authentication code in an authentication message;

determine, based on the first messaging identifier being included in the authentication message, that the authentication code was received from the first user device; and generate the registration mapping based on determining that the authentication code was received from the first user device.

18. The non-transitory computer-readable medium of claim 15, wherein the input is a first input,
wherein the one or more instructions further cause the device to:

receive session information associated with the application session,
wherein the session information includes a second messaging identifier of the second user device associated with the application session;

store, based on the session information and in a session management data structure, a session mapping that associates the second messaging identifier with the client identifier;

receive, from the second user device, a second input associated with the application session;

determine, based on the session management data structure including the session mapping, that the second user device is associated with the application session; and provide the second input to the media client to permit the application session to operate according to the second input.

19. The non-transitory computer-readable medium of claim 15, wherein the messaging protocol comprises at least one of:

a short message service (SMS) protocol;

a rich communication service (RCS) protocol; or a multimedia messaging service (MMS) protocol.

20. The non-transitory computer-readable medium of claim 15, wherein the status data is associated with a confirmation that an action, associated with the input, has been performed.

* * * * *